C. Roberts,
Washing Machine.

N° 55,161.  Patented May 29, 1866.

Witnesses;
C. P. S. Wardwell
M. B. Wardwell

Inventor:
Charles Roberts

UNITED STATES PATENT OFFICE.

CHARLES ROBERTS, OF LAKE VILLAGE, NEW HAMPSHIRE.

WASHING-MACHINE.

Specification forming part of Letters Patent No. 55,161, dated May 29, 1866.

*To all whom it may concern:*

Be it known that I, CHARLES ROBERTS, of Lake Village, in the county of Belknap and State of New Hampshire, have invented a new and useful Improvement in Washing-Machines; and I do hereby declare that the following is a full, clear, and exact description thereof, reference being had to the accompanying drawings, and to the letters of reference marked thereon.

Figure 1:
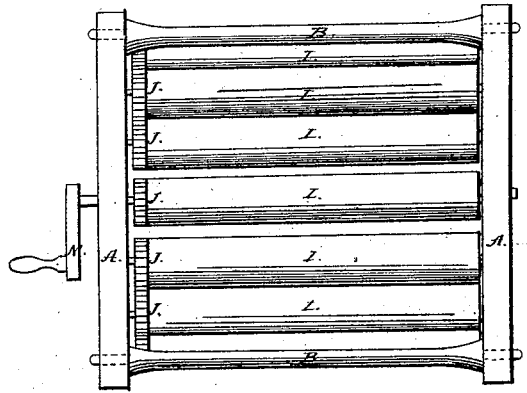
Figure 2:
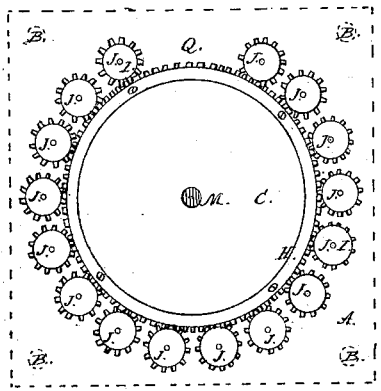
Figure 3:
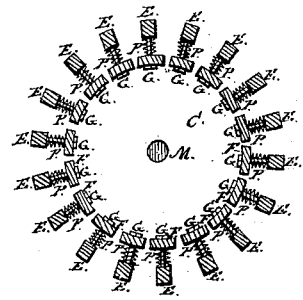
Figure 4:
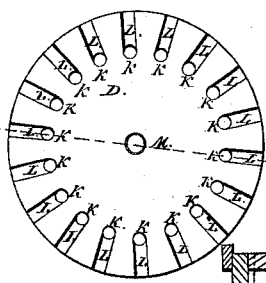
Figure 5:
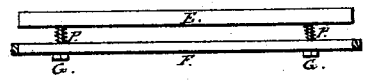
Figure 6:
Figure 7:
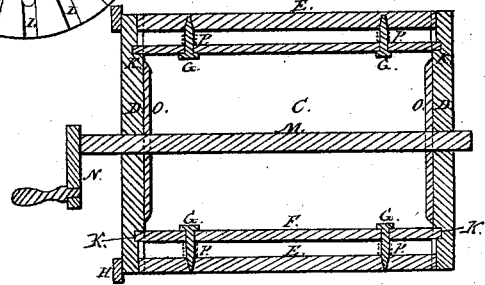

Figure 1 is a side elevation. Fig. 2 is an end view with one head A removed to show the gearing, the red lines being the outline or end view of the head. Fig. 3 is a transverse section of the cylinder C. Fig. 4 is a view of the inside of the cylinder-heads D D. Fig. 5 is a side view of the stationary bar F and yielding pressure-bar E of the cylinder C. Fig. 6 is a section view of Fig. 4 through the red line. Fig. 7 is a longitudinal section of the cylinder C complete.

A A, Fig. 1, are two heads (square) connected by four girts, B B, which constitute a frame to support the cylinder C, Fig. 7; also the several rolls, I I, Figs. 1 and 2, the journals of which have bearings in the two heads A A.

I I, Figs. 1 and 2, are sixteen rolls, more or less, arranged in a circle concentric with the axis M of the cylinder C, Fig. 2. These rolls have each a pinion-gear, J, attached to one end, of about the same diameter as the rolls themselves, and are driven by a gear, H, which is attached to the outside of the head D of the cylinder C, as shown by Fig. 7, also in Fig. 2.

Fig. 7 is the cylinder shown in section, being composed of a shaft, M, with its crank N, flanges O O, heads D D, (eighteen, more or less,) stationary bars F, and a corresponding number of yielding pressure-bars, E, with their screws G G and spiral springs P P. The flanges O O are fast to the shaft, and the heads D D are attached to them by screws. These heads have a number of radial recesses, L, corresponding with the number of pressure-bars on their inner faces or sides, as shown by Fig. 4, in which recesses the ends of the pressure-bars E move toward and from the axis of the cylinder. The inner end or part, K, of these recesses is deeper than the other parts, as shown by Fig. 6, to receive and hold the ends of the stationary bars F, which are made correspondingly longer, as shown by Fig. 5.

G G are screws which pass loosely through the stationary bars F, and are screwed into the yielding bar E, and serve as a stop and to regulate the distance these bars shall be forced out by the spiral springs P P, which surround the screws between the bars.

Q, Fig. 2, is a space or opening through which to introduce clothes into the machine.

The arrangement of the gears may be placed outside of the head A, if desired, the journal of the rolls extending through far enough to take the pinions and the driving-gear attached to the crank-shaft.

The pressure-bars may be narrow, as seen in Fig. 3, or as broad as may be and not touch each other while using. They may also have their outer surfaces corrugated lengthwise, if desired. The rolls may also be corrugated lengthwise or transversely, if desired.

The operation is as follows: Place the machine in a suitable tub or box with a sufficient quantity of soap-suds, turn the crank, and introduce the clothes through the opening Q, between the cylinder and the rolls, when the pressure-bars will yield according to the thickness of the clothes, and the clothes will rotate with the cylinder, passing successively under each roll, which expresses the water that was absorbed by the clothes after leaving the preceding roll. Several pieces or articles may be passed into the machine and washed at a time. After the clothes are sufficiently washed they can be taken out by taking them by the end as it comes opposite to the opening and conducting them out of the machine.

What I claim as my invention, and desire to secure by Letters Patent, is—

1. A washing-machine composed essentially of a concave of concentrically-arranged rolls I I, nearly touching each other, except a wider space at the top for the introduction of the clothes, and having a cylinder, C, with elastic or yielding pressure-bars revolving inside thereof, the whole to be placed within a tub or other vessel holding the water or suds, substantially as herein specified.

2. Giving the rolls I I a positive revolving motion nearly equal to and in the same direction as the pressure-bar surfaces of the revolving cylinder by means of pinions J J on said rolls and a driving cog-wheel, H, on the cylinder or its shaft gearing into said pinions, substantially as herein set forth.

3. The arrangement of the stationary bars F F and yielding pressure-bars E E in the heads of the cylinder C, substantially as herein described.

CHARLES ROBERTS.

Witnesses:
C. P. S. WARDWELL,
M. B. WARDWELL.